United States Patent [19]

Afghan et al.

[11] Patent Number: 4,640,807
[45] Date of Patent: Feb. 3, 1987

[54] PROCESS FOR THE PREPARATION OF SILICA SPHERES

[75] Inventors: Madjid Afghan; Josephus G. Sponselee, both of Amsterdam, Netherlands

[73] Assignee: Shell Oil Company, Houston, Tex.

[21] Appl. No.: 758,623

[22] Filed: Jul. 24, 1985

[30] Foreign Application Priority Data

Aug. 2, 1984 [GB] United Kingdom ................ 8419708

[51] Int. Cl.$^4$ ............................................ C01B 33/12
[52] U.S. Cl. .......................................... 264/13; 264/5; 264/56; 423/338; 423/339
[58] Field of Search ....................... 264/13, 63, 66, 56; 423/338, 339

[56] References Cited

U.S. PATENT DOCUMENTS 3,996,338  12/1976  Frampton ............................ 423/338

FOREIGN PATENT DOCUMENTS 0058441  8/1982  European Pat. Off. .
211332   7/1984  Fed. Rep. of Germany ...... 423/338
735146   8/1955  United Kingdom ................ 423/338
1525386  11/1974 United Kingdom .
2038303  7/1980  United Kingdom ................ 423/338

OTHER PUBLICATIONS

Kinetika i. Kataliz, vol. 18, No. 2 (1977), pp. 480–487.

*Primary Examiner*—Jan Silbaugh
*Assistant Examiner*—Mary Lynn Fertig

[57] ABSTRACT

Silica spheres are prepared in a process comprising:
(a) preparing a silica hydrosol by mixing an aqueous solution of an alkali metal silicate with an aqueous solution of an acid;
(b) converting the hydrosol into droplet form;
(c) aging the droplets in a fluid to produce hydrogel particles;
(d) partially drying the hydrogel particles at 10° to 60° C. in air having a relative humidity in the range of from 45 to 95%, to a water content in the range of from 0.3 to 1.3 kg/kg solids;
(e) decreasing the cation content of the hydrogel particles by ion-exchange in an aqueous medium to less than 10% w, calculated on dry material; and
(f) finally drying the hydrogel particles to obtain silica spheres.

15 Claims, No Drawings

PROCESS FOR THE PREPARATION OF SILICA SPHERES

FIELD OF THE INVENTION

The invention relates to a process for the preparation of silica spheres.

BACKGROUND OF THE INVENTION

Silica particles are applied on a large scale, for example, as catalysts, catalyst carriers, adsorbents, drying agents and the like. For most of these applications, spherical particles of uniform size with a high crushing strength are desired.

An attractive way to prepare such particles is the sol-gel method. According to this method, a silica hydrosol is prepared by mixing an aqueous solution of an alkali metal silicate with an aqueous solution of an acid. The hydrosol is converted into droplet form and the droplets are gelled to produce substantially spherical hydrogel particles. After having reduced the alkali metal content of the hydrogel particles, they are dried and optionally calcined.

Further, according to the process described in British Patent Specification No. 1,525,386 the hydrogel particles, prepared substantially as described above, are partially dried before their cation content is reduced and they are finally dried and calcined. Silica particles thus prepared show a high crushing strength.

A problem which remained to be solved was to acquire silica spheres showing not only a high crushing strength but also a narrow distribution with respect to particle size and pore volume. Although the droplets themselves have a uniform diameter, the diameter of the hydrogel particles may vary since during drying the diameter of a hydrogel particle shrinks.

It has now been found that by carefully choosing the conditions during the partial drying, silica particles can be obtained having very narrow distribution ranges of both particle size and pore volume.

SUMMARY OF THE INVENTION

The invention therefore relates to a process for the preparation of silica spheres which comprises:
(a) preparing a silica hydrosol by mixing an aqueous solution of an alkali metal silicate with an aqueous solution of an acid;
(b) converting the hydrosol into droplet form;
(c) aging the droplets in a fluid to produce hydrogel particles;
(d) partially drying the hydrogel particles at about 10° to about 60° C. in air having a relative humidity in the range of from about 45 to about 95%, to a water content in the range of from about 0.3 to about 1.3 kg/kg solids;
(e) decreasing the cation content of the hydrogel particles by ion-exchange in an aqueous medium to less than about 10%w, calculated on dry material; and
(f) finally drying the hydrogel particles to obtain silica spheres.

DESCRIPTION OF THE PREFERRED EMBODIMENTS

The properties of the silica spheres prepared according to the invention are such that both their size and their pore volume are within a narrow distribution range. The spheres are therefore excellently suitable for use as catalyst carriers in many chemical processes such as hydrodemetallization and ethanol synthesis from water and ethylene.

Moreover, these silica spheres do not contain any cracks which could lower their crushing strength. Cracks could arise when relatively dry air is used as a drying medium during the partial drying of the hydrogel particles.

It is important that during the partial drying the temperature remains in the range indicated. Partially drying with air, even humid air, at temperatures above about 60° C. results in overdrying of some hydrogel particles, i.e. some particles have a moisture content considerably lower than the moisture content aimed at, the latter moisture content generally corresponding with the average one. Eventually inferior spheres with a wide distribution range in particle size and pore volume are then obtained. Partially drying with air at a temperature below about 10° C. results in an unfeasibly slow process and problems with the drying equipment. Preferably, the hydrogel particles are partially dried to a water content of from about 0.45 to about 0.95 kg/kg solids.

Preferably, air having a relatively high humidity is used at temperatures so low as to exclude any chance of overdrying hydrogel particles. Therefore, the hydrogel particles are advantageously partially dried at about 15° to about 40° C. in air having a relative humidity in the range of from about 60 to about 95%. The air velocity during the partial drying appears not to be crucial. Suitable superficial air velocities are from about 0.2 to about 2.0 m/s. Preferred air velocities range from about 0.5 to about 1.5 m/s.

The pressure at which the partial drying is carried out may vary within wide ranges. Suitable pressures range between about 0.1 and about 100 bar. Preference, however, is given to pressures between about 0.8 and about 2 bar. Atmospheric pressure is very suitable from a practical point of view.

The partial drying can be carried out in any known drying equipment or series of drying equipments, e.g. a tray dryer, a fluid bed dryer or a rotary dryer. For suitable apparatuses, reference is made to Chemical Engineering, Mar. 5, 1984, pp. 53–61.

Very suitably at least one band dryer in which the hydrogel particles are passed on a conveyor belt and drying air is passed through the bed of particles, is used.

The hydrogel particles obtained after the aging of the hydrosol droplets have a very high moisture content. Generally, their moisture content amounts to about 4 to about 15 kg of water per kg of solids on a dry basis. Drying with humid air at a temperature of about 10° to about 60° C. to a moisture content of less than about 1.3 kg/kg solids would take an appreciable time. Therefore, from an economical point of view, it is desirable to shorten the duration of the partial drying. It has been found that substantially without any detrimental effect on the properties of the spheres prepared it is possible to carry out the partial drying in two steps by first drying the hydrogel particles at a relatively high rate, optionally at elevated temperature, and subsequently drying them with humid air at about 10°–60° C. In the first step, drying is preferably carried out to a moisture content of the hydrogel particles of about 1.4 to about 3.5 kg/kg solids. In the first step, the drying treatment itself may take place by heating the hydrogel particles carefully at atmospheric pressure or at reduced or elevated pressure. Water may also be removed from the hydrogel particles by contacting them with an inert liquid at a temperature above about 100° C. It is also possible to dry the particles at a relatively high rate using an air/steam mixture, which generally has a temperature above about 100° C.

Partial drying in the first step can be carried out conveniently by blowing air, preferably relatively dry air, over the hydrogel particles either at constant or variable temperatures provided that not even a small amount of the hydrogel particles are dried to a moisture content below about 1.4 kg/kg solids.

Therefore, it is preferred that the hydrogel particles are partially dried in two steps by drying them in a first step with air having a relative humidity below 45% to a water content in the range of from about 1.4 to about 3.5 kg/kg solids and subsequently drying them to a water content of from about 0.3 to about 1.3 kg/kg solids in a second step.

As to temperature applied in said first step, the hydrogel particles are preferably dried in the first step at a temperature in the range from about 60° to about 120° C.

The silica hydrosol can be prepared conveniently by mixing an aqueous solution of an alkali metal silicate with an aqueous solution of an acid. Suitable alkali metal silicates comprise the so-called waterglasses, based on $Na_2O/SiO_2$ having a sodium:silicon molar ratio between about 0.2 and about 1.0. Suitable acids are strong acids such as hydrochloric acid, nitric acid and especially sulfuric acid. Good results have been obtained using a molar ratio in the range about 0.5–1.2 acid/waterglass, especially using a molar ratio in the range about 0.6–0.8 acid/waterglass. The reactants can be used in various molar concentrations. Preferably, waterglasses are used in molar concentrations between about 0.5 and about 1.3 and the acid can be chosen accordingly.

After the silica hydrosol has been formed, it is converted into droplet form and aged in a fluid to yield a hydrogel. The fluid can be any gas or liquid which does not interfere with the hydrosol. Preferably, the fluid in which the droplets are aged, is air or a liquid which is not miscible with water, the latter fluid being especially preferred.

The formation of hydrosol droplets may suitably be performed by introducing the hydrosol via a small aperture in the bottom of the chamber where the mixing of silicate and acid took place, into a chamber filled with a liquid which is immiscible, or substantially immiscible with water such as an oil, e.g. a paraffinic oil. This may be performed suitably by introducing the hydrosol into the upper end of a vertically disposed tube filled with oil. It is also possible to spray the hydrosol in air to produce droplets.

Gelation occurs while the hydrosol droplets move downward in the fluid such as oil or air. The best results are obtained when a relatively short gelation time is applied, e.g. less than about 15 seconds, preferably between 3 and 12 seconds.

An apparatus very suitable for use in the preparation of hydrogel particles from a hydrosol, is disclosed in European Patent Application No. 58,441.

The gelled particles thus obtained may be caught in an aqueous phase such as water or, preferably, an aqueous solution of a salt such as sodium sulphate, particularly a salt solution having substantially the same salt concentration as that present in the hydrogel particles. The hydrogel particles are then separated from the aqueous phase, e.g. by filtration or centrifugation. It is also possible to separate them directly from the oil phase but that is more cumbersome in view of further steps in the preparation of the final particles. The hydrogel particles thus obtained contain large amounts of water and also contain, apart from silica, water-soluble sodium salts as well as chemically bonded sodium ions.

Subsequently, the gelled particles are subjected to partial drying as described above. It appears that the amount of water remaining in the partially dried hydrogel determines the pore volume of the silica spheres to be obtained. It also appears that the hydrogel particles, partially dried according to the above method, are within a narrow moisture-content-distribution range. This may be the reason why the pore volumes of the silica spheres, eventually obtained in the process according to the present invention, are within a narrow distribution range, too.

Further, it appears that uniform pore diameters of the silica spheres are obtained when the partially dried silica hydrogel particles are subjected to a hydrothermal treatment.

Thus, the hydrogel particles after partially drying them and before decreasing their cation content, are preferably subjected to a hydrothermal treatment. The hydrothermal treatment comprises subjecting the hydrogel particles at elevated temperature to hot liquid water and/or steam.

This treatment results in a controllable growth of the pore diameter while the pore volume is substantially retained. Suitably, the hydrothermal treatment is carried out with liquid water. It is advantageously carried out by submerging the hydrogel particles in a quantity of liquid water at least equal in volume to that of the hydrogel particles to be treated.

When the hydrothermal treatment is effected by treating the partially dried hydrogel particles with liquid water at elevated temperature, a treating temperature between about 50° C. and about 374° C. is generally chosen. Preferred treating temperatures are between about 80° C. and about 350° C. and in particular between about 100° C. and about 300° C. When using a treating temperature above about 100° C., the treatment is suitably carried out in a closed vessel under autogenous pressure. The treating times generally range between about 15 minutes and about 24 hours.

The volume of liquid water to be applied is preferably chosen such that during the treatment the partially-dried hydrogel particles are completely immersed in water. When using treating temperatures below about 100° C., it is sufficient to employ a quantity of liquid water substantially equal in volume to that of the hydrogel particles to be treated. This also holds when the treatment is carried out at a temperature above about 100° C. in a closed vessel under autogenous pressure, unless the volume of the closed vessel is sufficiently larger than the volume of the hydrogel particles and the volume of water to be applied. When the treatment is carried out at a temperature above about 100° C. in a closed vessel whose volume is considerably larger than twice the volume of the hydrogel particles to be treated, preferably a larger volume of liquid water is used.

When the hydrothermal treatment is carried out by treating the partially-dried hydrogel particles with water vapor at an elevated temperature, the treating temperature is generally chosen between about 100° C. and about 500° C., preference being given to temperatures in the range of from 100° C. to 300° C. The water partial pressure applied is preferably chosen between about 1 and about 40 bar. The heating times generally range between about 15 minutes and about 24 hours. The treatment may be effected either by keeping the hydrogel particles in a closed vessel in contact with a certain quantity of saturated water vapor or by continuously passing saturated water vapor over the hydrogel particles. In the latter case, it is preferred to use a linear gas velocity between about 0.01 and about 1.0 m/h.

It is advantageous to perform the hydrothermal treatment in the presence of one or more compounds selected from alkali metal compounds and alkaline earth metal compounds as well as $NR^1R^2R^3R^4$ compounds wherein $R^1$, $R^2$, $R^3$ and $R^4$ which may be the same or different each represent a hydrogen atom or a hydrocarbyl group, e.g. an alkyl group having up to about 12 carbon atoms, and $NH_3$.

Since the partially-dried hydrogel particles still contain alkali metal ions, there is no special need to add one or more of the compounds mentioned hereinbefore. In the event that the alkali metal salts had been removed from the hydrogel particles, fresh amounts of such compound or of any compound referred to hereinabove is suitably added prior to the hydrothermal treatment.

The amount of one or more compounds selected from the group of compounds of the alkali and alkaline earth metals as well as $NR^1R^2R^3R^4$-compounds and $NH_3$ present in the partially-dried hydrogel particles to be subjected to a hydrothermal treatment may vary between wide ranges, e.g. an amount of from about 0.1 gram of the compound concerned up to about 25 g of the compound per 100 gram of the silica in the particles to be hydrothermally treated. Preference is given to the use of compounds in the amount of from 0.5 to 15 g per 100 g of silica in the particles to be treated. Good results have been obtained using hydrogel particles still containing part or all of the alkali metal ions, e.g. sodium ions present therein because of the formation of the hydrosol as discussed hereinbefore.

Subsequently, the cation content of the hydrogel particles is decreased by ion-exchange. Normally, the cations present are alkali metal ions originating from the silicate compound used in the formation of the hydrosol. It is also possible that the cations are present since they were added to facilitate the hydrothermal treatment.

The decrease in the amount of cation can be conveniently performed by washing the hydrogel particles once or several times with water so that the concentration is reduced to the desired level. Depending on the intended use of the final silica spheres, the amount of cation may be reduced preferably to 7% or less, calculated on dry material when an alkaline catalyst carrier is desired, or preferably to less than 1%w when neutral catalyst carriers are required. In the latter case, it may be advantageous to subject the hydrogel particles to a treatment with an inorganic or organic acid in order to remove cations bound to the hydrogel particles, sulfuric acid being preferred. Also, aqueous solutions of ammonium salts, e.g. ammonium nitrate can be used to reach the desired low alkali metal content of the particles. It should be noted that ammonium ions, which have replaced any cations bound to the hydrogel particles can easily be decomposed by heating the ammonium ions-containing particles.

Subsequently, the hydrogel particles are finally dried. This drying may be carried out by methods known in the art. The final drying conditions appear not to be crucial. For instance, the hydrogel particles can be finally dried smoothly by heating them at a temperature of about 100° C. at a reduced pressure or by heating them at a temperature above 100° C. at reduced pressure or by heating them at a temperature above 100° C. in a stream of air. Other methods are also applicable. Normally, the hydrogel particles are dried for several hours at temperatures up to about 200° C. to produce silica spheres. These silica spheres generally contain less than about 0.2 kg water/kg solids, preferably between about 0.01 and about 0.1 kg water/kg solids.

To remove the last traces of water, silica spheres obtained in step (f) of the process according to the present invention after finally drying the hydrogel particles are preferably subjected to a calcination. The calcination may be carried out by methods known in the art.

It will be appreciated that higher calcination temperatures generally will be used when the dried hydrogel contains ammonium ions as described hereinbefore. The temperature at which the calcination occurs may vary between wide ranges. Normally, temperatures up to about 600° C. can be used but higher temperatures are not excluded. It may even be advantageous for certain applications to carry out the calcination at a temperature up to about 1000° C., preferably between about 800° C. and about 950° C. Normally, calcining will be carried out during relatively short periods, e.g. periods of up to one hour, but longer periods may also be used.

The atmosphere in which the calcination is carried out does not influence the properties of the silica spheres obtained. Therefore, the silica spheres may suitably be calcined in air, nitrogen, inert gas, hydrogen and the like or mixtures of these gases. However, for practical reasons calcination in air is preferred.

The silica spheres thus prepared are suitably used as carriers for catalytically active compounds. They are of particular importance as carriers for catalysts used in the hydrodemetallization of heavy hydrocarbon oils, the epoxidation of olefinically unsaturated compounds with organic hydroperoxides and the hydration of olefins to produce alkanols.

In a hydrodemetallization process, catalysts are preferred comprising at least one of the metals selected from the group consisting of nickel, cobalt, molybdenum, tungsten and vanadium on a silica carrier. Especially catalysts comprising the combination nickel/vanadium on silica spheres prepared according to the present invention are preferred.

Epoxidation of olefinic compounds is, for instance, applied in the production of epichlorohydrin from allyl chloride. It is carried out by contacting the olefinic compounds with a catalyst preferably comprising at least one metal selected from molybdenum, tungsten, titanium, zirconium and vanadium on a silica carrier. Especially preferred are catalysts comprising titanium on silica spheres prepared according to the present invention.

Alkanols may be prepared by contacting olefins and water in the gaseous state with a silica carrier, impregnated with phosphoric acid. Preferably, silica spheres prepared according to the present invention are applied as the carrier.

The invention will now be illustrated with the aid of the following examples which are not to be construed as limiting the invention.

EXAMPLE 1

An aqueous waterglass solution comprising 12%w $SiO_2$ and having a $Na_2O/SiO_2$ molar ratio of 0.3 was mixed continuously in a mixing chamber with an aqueous 1.2N sulfuric acid solution in a volume ratio acid solution/waterglass solution of 0.65, producing a hydrosol. After a residence of a few seconds in the mixing chamber the hydrosol was converted in a droplet form by passing the hydrosol through a nozzle with a diameter of about 5 mm. The droplets were allowed to fall through a tube filled with paraffinic oil having an ambient temperature during which they gelated. Gelation time was 5 sec. In this procedure, the apparatus described in European Patent Application No. 58,441 was used. The hydrogel particles thus produced were separated from the oil by means of settling and washed with water.

Subsequently portions thereof were partially dried in several experiments by blowing air having different humidity over the particles under conditions given in Table I. In Experiments 1 and 2, the hydrogel particles were partially dried with humid and dry air, respectively. In Experiment 3, the hydrogel particles were first subjected to a drying step using relatively dry air and subsequently to a second step using humid air. After the partial drying, the particle size distribution was determined using standard sieves. The results obtained are presented in Table I.

From the experiments it is apparent that drying with dry air at elevated temperature requires a short drying time, but results in a wide particle size distribution. Drying with humid air gave excellent results with respect to the particle size distribution, although drying took considerable time. Drying time could be substantially shortened by first drying with dry air (10 minutes) and subsequently with humid air (30 minutes), while still results superior to those obtained by dry air drying were attained, as is apparent from the data of Experiment No. 3.

EXAMPLE 2

The preparation of hydrogel particles as described in Example 1 was repeated, the drying conditions being indicated in Table II. After the partial drying the hydrogel particles were subjected to a hydrothermal treatment by immersing them in water and heating them at autogenous pressure at about 120° C.

The hydrogel particles thus obtained were treated with a 0.4N sulfuric acid solution to remove sodium ions to such an extent that the amount of sodium ions was less than 0.2%w, calculated on dry material. The particles were subsequently dried for 2 hours at 150° C. producing silica spheres, which were finally calcined at 850° C. for 45 minutes in air.

The particle size distribution was determined after the partial drying, whereas the pore volumes of the particles with the desired particle size were determined after the final calcination by mercury porosimetry. It is noted that after the partial drying the particle size substantially does not change further.

From the results, it is apparent that silica spheres prepared according to the present invention are within a narrow distribution with respect to both particle size and pore volume (exp. 5) whereas a much wider particle size distribution is obtained by using dry air (exp. 4).

From comparison of the moisture contents of the fractions and the pore volumes of said fractions, it appears that the pore volume is substantially proportional to the moisture content.

The mean side crushing strength of all particles prepared is rather good and ranges from 40 to 50N.

TABLE II

| Exp. No. | Drying Time Min. With Dry Air | Drying Time Min. With Humid Air | Air Velocity M/S Of Dry Air | Air Velocity M/S Of Humid Air | Air Humidity % Of Dry Air | Air Humidity % Of Humid Air | Air Temperature °C. Of Dry Air | Air Temperature °C. Of Humid Air | Initial Moisture Content Of Hydrogel Particles kg/kg Solids |
|---|---|---|---|---|---|---|---|---|---|
| 4 | 12 |  | 1.0 |  | 3 |  | 90 |  | 6.62 |
| 5 | 8 | 90 | 1.0 | 1.0 | 3 | 72 | 90 | 29 | 5.21 |

| Exp. No. | Particle Size Distribution (d in mm) % d < 2.36 | 2.36 < d < 2.8 | 2.8 < d < 3.35 | d > 3.35 | Moisture Content of Fractions kg/kg Solids 2.36 < d < 2.8 | 2.8 < d < 3.35 | Pore Volume of Particles ml/g 2.36 < d < 2.8 | 2.8 < d < 3.35 |
|---|---|---|---|---|---|---|---|---|
| 4 | 32.5 | 51.7 | 12.4 | 3.4 | 0.53 | 0.71 | 0.95 | 1.13 |
| 5 | 12.2 | 71.5 | 12.0 | 4.3 | 0.62 | 0.60 | 1.08 | 1.05 |

We claim:

1. A process for the preparation of silica spheres which comprises:
   (a) preparing a silica hydrosol by mixing an aqueous solution of an alkali metal silicate with an aqueous solution of an acid;
   (b) converting the hydrosol into droplet form;
   (c) aging the droplets in a fluid to produce hydrogel particles;
   (d) partially drying the hydrogel particles at 10° to 60° C. in air having a relative humidity in the range of from 45 to 95%, to a water content in the range of from 0.3 to 1.3 kg/kg solids;
   (e) decreasing the cation content of the hydrogel particles by ion-exchange in an aqueous medium to less than 10%w, calculated on dry material; and
   (f) finally drying the hydrogel particles to obtain silica spheres.

TABLE I

| Exp. No. | Drying Time Min. With Dry Air | Drying Time Min. With Humid Air | Air Velocity M/S Of Dry Air | Air Velocity M/S Of Humid Air | Air Humidity % Of Dry Air | Air Humidity % Of Humid Air | Air Temperature °C. Of Dry Air | Air Temperature °C. Of Humid Air | Initial Moisture Content Of Hydrogel Particles kg/kg/solids | Particle Size Distribution (D In MM) d < 2.36 % | 2.36 < d < 2.8 % | d > 2.8 % | Moisture Content Of Fraction 2.36 < d < 2.8 kg/kg Solids |
|---|---|---|---|---|---|---|---|---|---|---|---|---|---|
| 1 |  | 96 |  | 1.2 |  | 58 |  | 50 | 6.87 | 7.9 | 86.1 | 6.0 | 0.37 |
| 2 | 14 |  | 1.5 |  | 3 |  | 90 |  | 6.97 | 6.7 | 60.2 | 33.1 | 0.46 |
| 3 | 10 | 30 | 1.5 | 1.1 | 3 | 55 | 90 | 53 | 6.82 | 9.7 | 71.8 | 18.5 | 0.33 |

2. The process of claim 1 wherein the hydrogel particles are partially dried to a water content of from 0.45 to 0.95 kg/kg solids.

3. The process of claim 1 wherein the hydrogel particles are partially dried at 15° to 40° C. in air having a relative humidity in the range of from 60 to 95%.

4. The process of claim 1 wherein prior to step (d), the hydrogel particles are partially dried with air having a relative humidity below 45% to a water content in the range of from 1.4 to 3.5 kg/kg solids.

5. The process of claim 4 wherein the hydrogel particles are partially dried at a temperature in the range of from 60° to 120° C.

6. The process of claim 1 wherein the fluid in which the droplets are aged is air or a liquid which is not miscible with water.

7. The process of claim 1 wherein the hydrogel particles, after partially drying them and before decreasing their cation content, are subjected to a hydrothermal treatment.

8. The process of claim 7 wherein the hydrothermal treatment is carried out by submerging the hydrogel particles in a quantity of liquid water at least equal in volume to that of the hydrogel particles to be treated.

9. The process of claim 7 wherein the hydrothermal treatment is carried out at a temperature in the range of from 80° to 350° C.

10. The process of claim 9 wherein the temperature of the hydrothermal treatment is in the range of from 100° to 300° C.

11. The process of claim 1 wherein the cation content of the hydrogel particles is decreased to less than 7%w, calculated on dry material.

12. The process of claim 11 wherein the cation content is decreased to less than 1%w, calculated on dry material.

13. The process of claim 1 wherein the silica spheres obtained in step (f) after finally drying the hydrogel particles, are subjected to a calcination.

14. The process of claim 13 wherein the calcination is carried out at a temperature up to 1000° C.

15. The process of claim 14 wherein the temperature of the calcination is in the range of from 800° to 950° C.

* * * * *